(No Model.) 2 Sheets—Sheet 1.
J. F. MARTIN.
CONDUIT FOR ELECTRIC WIRES.
No. 286,950. Patented Oct. 16, 1883.
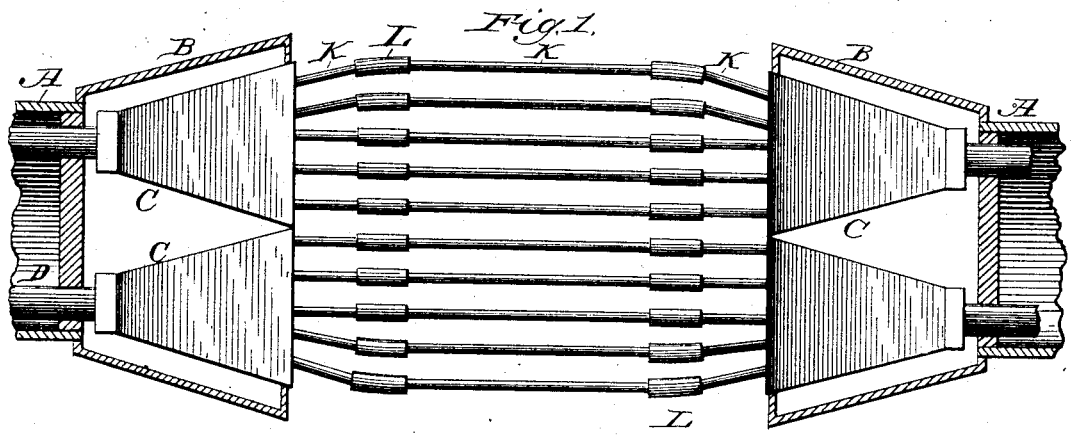
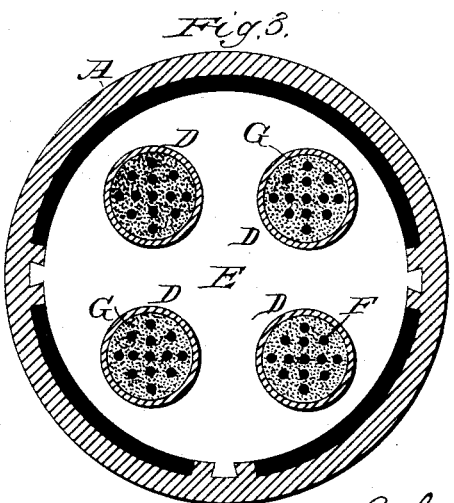
Witnesses.
Will R. Omohundro.
W. W. Elliott
Inventor.
John F. Martin
By
Jno. G. Elliott
Atty.

(No Model.) 2 Sheets—Sheet 2.
J. F. MARTIN.
CONDUIT FOR ELECTRIC WIRES.
No. 286,950. Patented Oct. 16, 1883.
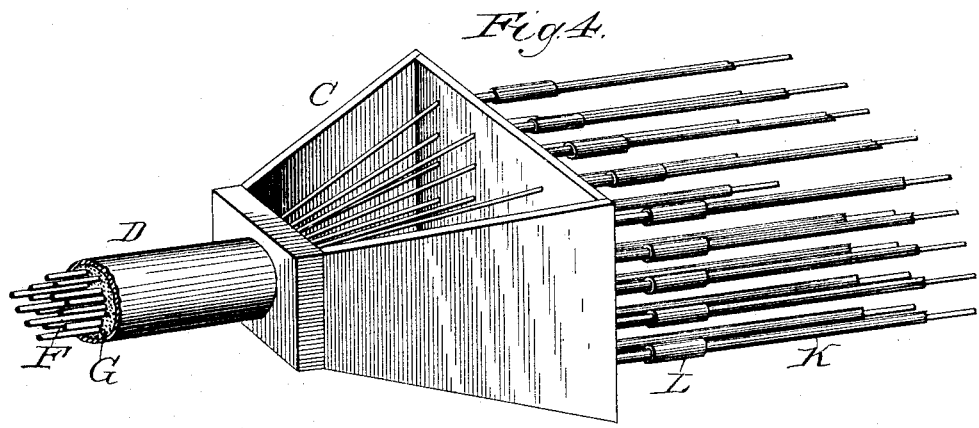
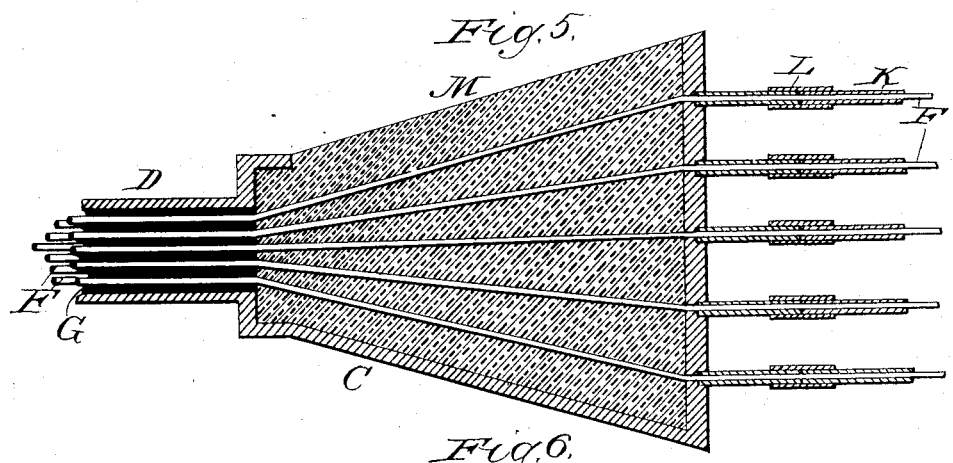
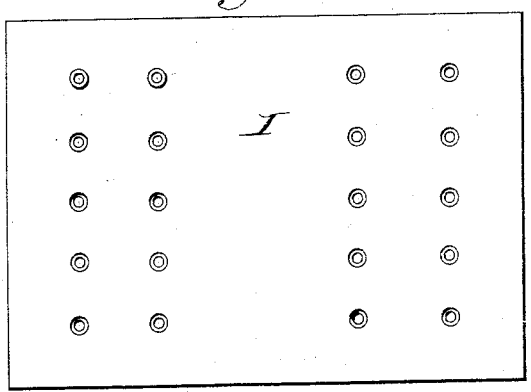

UNITED STATES PATENT OFFICE.

JOHN F. MARTIN, OF CHICAGO, ILLINOIS.

CONDUIT FOR ELECTRIC WIRES.

SPECIFICATION forming part of Letters Patent No. 286,950, dated October 16, 1883.

Application filed April 2, 1883. (No model.)

*To all whom it may concern:*

Be it known that I, JOHN F. MARTIN, a citizen of the United States, residing in Chicago, county of Cook, and State of Illinois, have invented certain new and useful Improvements in Underground Conduits for Electric Wires, of which the following is a specification.

This invention relates to that class of underground systems for electric conductors in which the wires are carried through a conduit interrupted at intervals by wells, vaults, or test-boxes, and more especially a conduit in which the wires are disposed so as to form a multiple-wire cable.

The objects of my invention are to provide simple and efficient means for distributing and insulating the wires within the well, vault, or test-box, whereby the wires from any number of cables entering the well can be connected with the wires of continuations of the said cables, or with other wires leading on from the well through the main conduit or branch pipes, or to elevated distributers, from which the wires are carried to houses along the route. A further object is to provide means for supporting and insulating the wires within the well, and for allowing them to be readily inspected and easily distinguished, whereby both the cables can be known, and also the individual wires thereof readily recognized by the person repairing, inspecting, or connecting the wire, and also connections made without distributing the multiple-wire cables in the main conduit or branches thereof.

To such end my improvement consists in the devices hereinafter described, and illustrated in the annexed drawings, in which—

Figure 1 represents a part top or plan and part horizontal sectional view of devices constructed and arranged in accordance with my invention. Fig. 2 is a front view of one of the casings and indicator-boards. Fig. 3 is an enlarged section, taken transversely through a conduit-pipe and several multiple-wire cables supported therein. Fig. 4 is an enlarged perspective view of one of the boxes through which the wires are carried. Fig. 5 is a longitudinal vertical section, taken through the box, with the wires embedded in some insulating compound. Fig. 6 represents perforated indicator-boards.

Referring by letter to the several figures of the annexed drawings, in which like letters denote like parts, A indicates pipe-sections of an underground conduit, which will in practice be interrupted at any desired points by wells or test-boxes. Within a well or test-box of any ordinary or convenient construction I propose placing casings B, with which the conduit-pipes entering the well or test-box are connected in any suitable way—such, for example, as shown in Fig. 1. Within each one of these cases are arranged boxes C, that are made flaring at one end and fitted within the casings so that their larger ends shall be at or near the front vertical sides of the casings. Each box has its smaller rear end connected with one of a set of pipes, D, that run through the conduit, and are supported therein in some convenient way—as, for example, by disks E, provided with dovetails, which fit in grooves formed longitudinally in ribs on the inner wall of the conduit, whereby air-passages are left between the conduit-pipe and the disks. The electric wires F pass through the pipes D, and from thence are carried through the boxes and across the well or test-box, so as to form continuous lines.

I prefer employing in this connection that class of multiple-wire cables in which the wires are embedded in a body, G, of some insulating compound contained within a lead pipe. As such compounds used in connection with wires and lead pipe are well known, a description of any particular one is regarded as unnecessary. The wires from the lead or other pipes are passed into the boxes, and, as they approach the larger or flaring front ends of the boxes, are spread apart and carried through perforations H in the indicator-boards I, which are arranged at the front ends of the said boxes. The ends of the wires thus carried through the boxes can be joined within the well or test-box; and in order to insulate those portions of the wires that are between the boxes, I provide insulating-tubes K, which can be coupled together by means of sleeves L, adapted to be slipped upon the tubes.

Numerals for designating the wires are placed upon the indicator-boards alongside of the perforations, and by spreading the wires as illustrated, not only can the wires be more conveniently handled, but, also, they can be more readily distinguished from each other.

The casing in which the flaring boxes are located will have a suitable lid or cover, which can be taken off or opened, so as to permit access to be had to the boxes. Each box is made open at the top, so that after the wires have been carried through the same, some suitable insulating compound—such, for example, as asphaltum—can be filled into the box, whereby the wires within the latter will be embedded in a body, M, of insulating material.

In Fig. 3, I have shown four pipes supported by a disk within the conduit-pipe, and in the preceding figure I have illustrated two indicator-boards, each provided with perforations for the wires, which are carried through and extended out from the pipes thus supported. In this way different kinds of wires can be effectively separated, so that disturbances are avoided.

If it is desired to induce a current of air through the conduit, blowers or chimney-stacks can be employed in connection with the conduit in any known or approved way.

In lieu of having two perforated boards for one box, but one perforated board could be employed, and, if desired, a door, N, in the front of the latter can be employed, so as to facilitate drawing the wires through the box.

The insulating-tubes arranged between the boxes will be preferably made of some insulating material, so that they can be bent in order to allow the wires from one box to be carried round to the box connected with a lateral branch pipe leading from the conduit. The tubes have their ends inserted in the indicator-boards, so as to fully insulate the wires. The wires can be tightened or strengthened in any convenient way, and will be firmly held in place by the insulating compound in which they are embedded. I also propose indicating the sets of wires from the cables by name, letters, or numbers, which can be placed upon the perforated indicator-board. In the present instance I have shown letters as a means for indicating the cables. The wires from cables thus entering the well or box can be connected with the wires of other like cables entering the well; or they can connect with wires laid within small tubular insulators, either in a pipe or pipes leading from the well, either under the street as a continuation of the main, or as a branch or branches to buildings, or underground or elevated distributing-boxes.

By employing flexible tubular insulators within the well or box, the wires can be readily bent and connections made without disturbing the cables.

Having thus described my invention, what I claim, and desire to secure by Letters Patent, is—

1. The combination, with a box made flaring at one end, of a multiple-wire cable passing into the smaller end of the box, the wires of said cable being carried through the box and spread apart as they approach its larger end, and being embedded in some insulating compound, substantially as described.

2. The combination, with a casing connected with a conduit-pipe, of a box located within said casing, and provided with a perforated indicator-board, and a multiple-wire cable passing through the conduit-pipe to the box, and having its wires carried through the latter and embedded in a body of some insulating compound, substantially as described.

3. The combination, with the casings connected with the pipe-section of an underground conduit, of the boxes inclosed by said casings, and perforated indicator-boards at their front ends, the multiple-wire cables passing through the conduit to the boxes, and having their wires carried through and spread apart within the same, substantially as described.

JOHN F. MARTIN.

Witnesses:
W. W. ELLIOTT,
JNO. G. ELLIOTT.